H. E. WILLSIE.
REFRIGERATING MACHINE.
APPLICATION FILED MAR. 11, 1920.
Reissued June 15, 1920. 14,884.
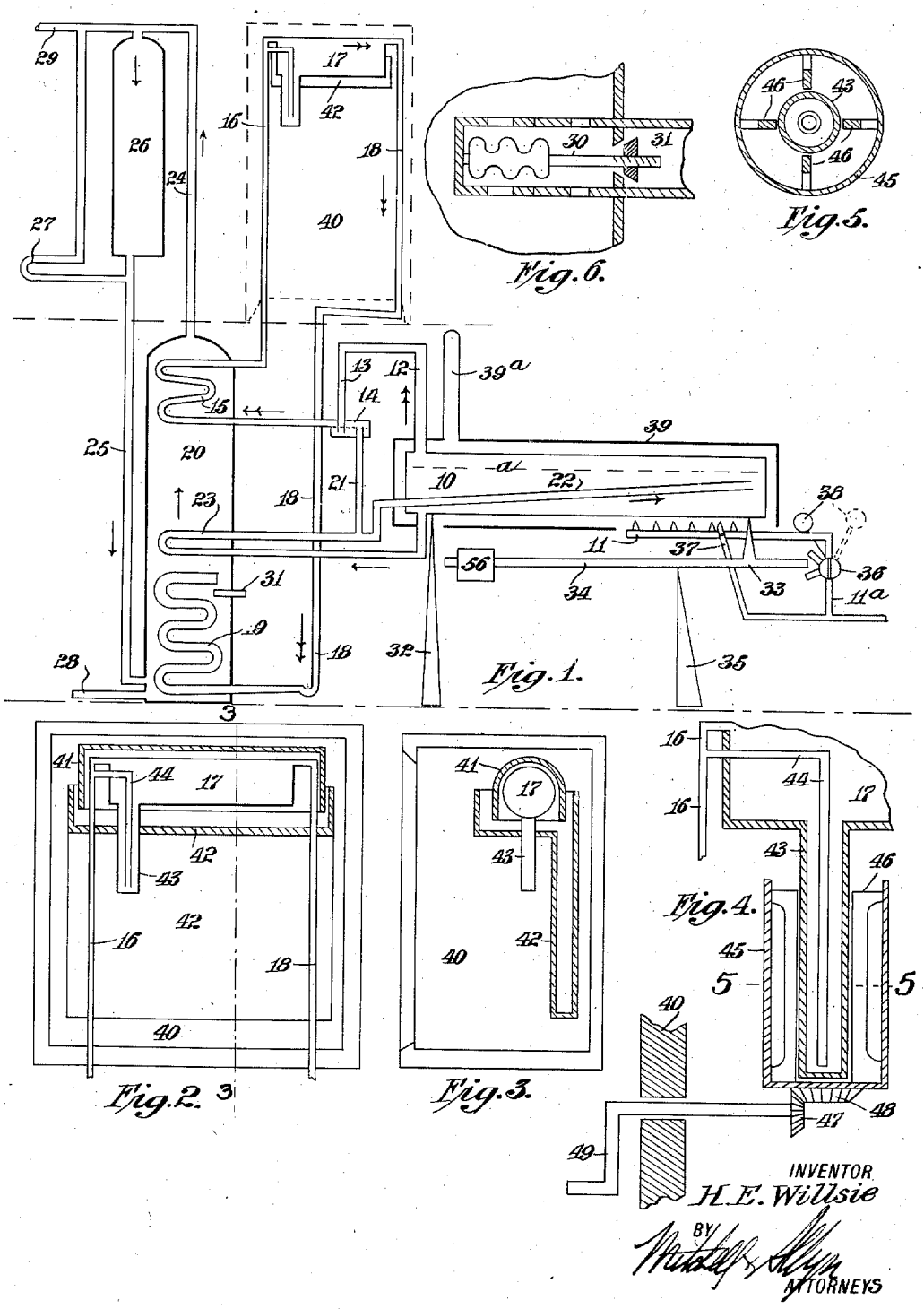

UNITED STATES PATENT OFFICE.

HENRY E. WILLSIE, OF DARIEN, CONNECTICUT, ASSIGNOR TO THE AMERICAN REFRIGERATION COMPANY, A CORPORATION OF NEW JERSEY.

REFRIGERATING-MACHINE.

14,884. Specification of Reissued Letters Patent. Reissued June 15, 1920.

Original No. 1,314,779, dated September 2, 1919, Serial No. 859,727, filed September 2, 1914. Application for reissue filed March 11, 1920. Serial No. 365,039.

*To all whom it may concern:*

Be it known that I, HENRY ELMER WILLSIE, a citizen of the United States, and a resident of Darien, Connecticut, formerly of Cranford, in the county of Union and State of New Jersey, have invented certain new and useful Improvements in Refrigerating-Machines, of which the following is a specification.

The general object of my invention is to produce a refrigerating apparatus of the intermittent absorption type suitable for use in residences. The more specific objects of my invention are: to avoid the use of valves in the ammonia system; to provide means to automatically air insulate the evaporator during the heating period and to continue the refrigeration in the refrigerator box; to automatically water cool the contents of the still-absorber during the gas absorbing period; to provide an ice cream freezing device within the refrigerator; to utilize the heated condenser water in the house service and thereby save fuel expense; and to automatically turn on and off the fuel gas by means of the varying weight of the still-absorber.

I attain these objects by the mechanism shown in the accompanying drawing, in which, Figure 1 is a diagrammatic elevation of the apparatus; Fig. 2, a vertical longitudinal section through the evaporator; Fig. 3, a section of the same on the line 3—3 Fig. 2; Fig. 4, a vertical section of the ice cream freezing attachment; Fig. 5, a cross section of the same on the line 5—5 Fig. 4; and Fig. 6 a vertical section of the expansion drain valve.

Similar characters refer to similar parts.

The construction and operation of my machine is as follows: A still-absorber tank, 10, is filled with aqua-ammonia to about the level of the dotted line *a*, and heated by the combustion of fuel gas at the burner 11, thus driving ammonia gas through the pipes 12, 13, the trap 14, the rectifying coil 15, the pipe 16, the evaporator 17, the pipe 18, into the condenser coil 19, where the gas is liquefied. The direction of this flow of gas is indicated by double headed arrows. When the gas is turned off, allowing the still-absorber to cool and its pressure to decrease the liquid ammonia in the condensing coil 19 is forced up the pipe 18 into the evaporator 17, where its evaporation produces refrigeration. The water in tank 20 serves to cool the pipes 15, 19, and 23.

Moisture condensed in the rectifying coil 15 has collected in the trap 14. The pressure of the returning gas forms a column of liquid in the pipe 13 which directs the flow of gas through pipes 21, 23, and 22 into the still-absorber 10. The cooling coil, 23, is below the still-absorber and connected to it and to the pipes 21, and 22. Because of the low level of the cooling coil 23 there is no circulation of liquid through it during the heating period and therefore no important loss of heat because of it, but the returning gas mixing with and being absorbed by the liquid in the coil 23 and the pipe 22 sets up a circulation of liquid, in the direction indicated by the single barbed arrow, through the coil 23, thereby cooling the liquid in the still-absorber and hastening the absorption. The pipes 22 and 23 constitute a circulating device.

The water tank 20 may be connected by the pipes 24, 25 to the elevated water reservoir 26. Heat from the coils 15, 19, 23 warms the water in tanks 20, 26 and sets up a circulation of water in the direction indicated by the single headed arrows. The reservoir 26 is connected to an auxiliary fuel heated coil 27. Cold water is supplied through the pipe 28 and warm water for use in the house is drawn off through the pipe 29. In case the water about the condensing coil 19 becomes too warm the expansion valve 30 opens at a predetermined temperature allowing water to flow from the pipe 28, around the coil 19, and out of the pipe 31. See Fig. 6.

To turn the fuel gas on and off the still-absorber is pivotally supported at one end on the column 32 and at the other end on the arm 33 of the lever 34 which is pivotally supported on the column 35. The lever is balanced by the weight 56 so that when the predetermined amount of ammonia has been evaporated, thereby lessening the weight of the still-absorber, the lever arm 33, moving upward, engages the gas cock 36, in the gas service pipe 11[a], to close it. Also when the ammonia has been reabsorbed, thereby increasing the weight of the still-absorber, the lever arm 33, moving downward, opens the gas cock 36 and the fuel gas is lighted by the continuously burning pilot light 37. The gas cock 36 is provided with a weighted arm 38 which, as it is forced past its center of support by the lever arm 33, completes the movement of the gas cock. There is sufficient flexibility in the connecting pipes for a movement of the still absorber. The still-absorber is surrounded by a heat retaining casing 39 provided with a flue pipe 39[a].

The evaporator, 17, within the upper part of the refrigerator box 40, is surrounded except for the lower portion, by the air-tight casing 41. The lower edges of this casing extend below the level of the evaporator and into the brine in the brine tank 42. The casing 41 is thus sealed air tight. During the heating period the air between the casing 41, and the evaporator 17 expands, lowering the brine from contact with the evaporator and thus keeping the brine from being heated to a harmful amount. During the absorbing period the air within the casing 41 contracts drawing up the brine into contact with the evaporator, thus cooling the upper surface of the brine and setting up a brine circulation whereby all the brine is cooled. The brine tank is preferably deep and contains sufficient brine for refrigeration during the heating period.

The evaporator 17 is provided with a downwardly extending pipe or chamber 43 closed at its lower end, and located within the refrigerator box. A tube 44 has an opening near the bottom of the chamber 43 and connects into pipe 16 at a little below the level of the full amount of ammonia used in the evaporator. When the evaporator fills with a fresh charge of ammonia any excess, either of moisture or ammonia, drains up the tube 44 and down the pipe 16. The evaporator extension 43 may be utilized for freezing ice cream, etc. For this purpose it is surrounded by a can 45 containing the material to be chilled. The can is provided with scrapers 46, 46, and also with gears 47, 48 which may be turned by the crank 49. The crank shaft extends through the wall of the refrigerator box so that the can 45 may be rotated from outside the refrigerator.

I plan to place the still-absorber and the cooling coils 15, 23, 19 and the tank 20 in the basement of a house, and the refrigerator and the reservoir on the floor above. However the reservoir 26 may be an open top tank placed in the attic. The coils 15, 23, 19 and the tank 20 may take the form known as a double pipe type, in which the ammonia pipe usually surrounds the flowing water pipe, and then the water pipes take the function of the tank 20.

I prefer to use water without any salt in the brine tank for cleanliness in a domestic refrigerator, unless a low temperature is desired. The ice forming on the evaporator drops away from it during the heating period and carries the refrigeration.

What I claim and desire to secure by Letters Patent is:

1. In a refrigerating machine, a still-absorber having a pivotal support adjacent one of its ends, a pivotally supported lever adapted to support the other end of said still-absorber, a burner for heating said still-absorber, a valve for controlling the supply of fuel to said burner, and operating means intermediate said lever and said valve.

2. The combination with a still-absorber and a condenser-evaporator connected in an operative cycle, of a coil below the still absorber with both ends connected to the still-absorber and adapted to be filled with liquid from the still-absorber, and a pipe for returning gas to the still-absorber connected to the coil.

3. The combination with a still-absorber and a condenser-evaporator connected in an operative cycle, of a tank for cooling water, a coil in said tank below the level of the still-absorber and connected at both ends to the still-absorber, and a return gas pipe connected to said coil.

4. The combination with a still-absorber and a condenser-evaporator connected in an operative cycle, of a coil below the level of the still-absorber and connected at both ends to the still-absorber, a return gas pipe connecting the condenser-evaporator to said coil, and means for cooling said coil.

5. In a refrigerating machine, a still-absorber adapted to contain a liquid, a condenser-evaporator connected with said still-absorber, a cooling member, means connecting said cooling member with said still-absorber and through which liquid from said still-absorber may circulate through said cooling member, and a gas return pipe leading from said condenser-evaporator and communicating with said connecting means.

6. In combination, a still absorber, an evaporator, a condenser connected in an operative cycle of a coil below the level of the still absorber and connected to said still-absorber, a return gas pipe to direct gas into said coil to provide means for circulating the still absorber liquid through said coil during the absorbing period.

7. In combination, a still absorber, an evaporator and a condenser connected in an operative cycle of a coil connected to the still-absorber to cool liquid from the still-absorber during the absorbing period, a return pipe for gas, said pipe connecting the evaporator to the still-absorber to direct gas into said coil whereby the return gas sets up a circulation of liquid from the still-absorber through said coil.

8. In combination, a still absorber, an evaporator and a condenser connected in an operative cycle of a coil connected to the still-absorber and located in part below the level at which heat is applied to the still-absorber and means for returning gas to the said still-absorber through a portion of said coil.

9. The combination of a tank for cooling water, a condenser adapted to be cooled by the water in said tank, a supply pipe connecting into said tank, a discharge pipe leading out of said tank, and a thermostatic valve for regulating a flow of water through said discharge pipe.

10. In a refrigerating machine, a tank adapted to contain a liquid to be cooled, an evaporator adjacent the surface of the liquid in said tank, and an open bottom casing inclosing said evaporator and depending into the liquid in said tank.

11. In a refrigerating machine, a tank adapted to contain a liquid to be cooled, an evaporator with which the liquid in said tank may contact, and means dependent for operation upon the temperature within said evaporator for determining the area of contact between said evaporator and said liquid.

12. The combination with a still-absorber, a condenser and evaporator, all connected in an operative cycle, of a brine tank inclosing the lower portion of the evaporator, and a casing partly inclosing the evaporator and opening into the brine tank at a lower level than the bottom of the evaporator.

13. The combination with a still-absorber, a condenser and evaporator, all connected in an operative cycle, of a vertical cylindrical chamber closed at the bottom and connected to the bottom of the evaporator, a tube opening into the bottom of the chamber and into a pipe connecting the evaporator to the still-absorber for draining an excess of liquid toward the still-absorber.

14. Refrigerating apparatus comprising a still-absorber, a water cooled circulating device connected to the lower part thereof, a refrigerating device connected to said still absorber and to said circulating device, and a condenser connected to said refrigerating device.

15. Refrigerating apparatus comprising a still-absorber, a rectifying device connected thereto, a refrigerating device connected to said rectifying device, a condenser connected to said refrigerating device, and a water cooled circulating device connecting said rectifying device with said still-absorber.

16. Refrigerating apparatus comprising a still-absorber, a trap connected to the upper part thereof, a refrigerating device connected with the upper part of said trap, a condenser connected to said refrigerating device, and a water cooled circulating device for the still absorber connected with the upper part of said trap.

17. Refrigerating apparatus comprising a still-absorber, a water cooled rectifier connected thereto, a condenser, a refrigerator connected between said rectifier and said condenser, a water cooled circulating device connected to the lower part of said still-absorber, and a connection between said rectifier and said circulating device.

18. Refrigerating apparatus comprising a still-absorber, a trap, a pipe connecting the upper part of said still-absorber to the lower part of said trap, a refrigerating device connected with the upper part of said trap, a condenser, a pipe connecting the upper part of said refrigerating device with the lower part of said condenser, and a water cooled circulating device connecting the upper part of said trap with the lower part of said still-absorber.

19. Refrigerating apparatus comprising a still-absorber, a cooling tank, a rectifier, a circulating device, and a condenser, all of the latter three having portions extending into said cooling tank, a refrigerator connected between said rectifier and said condenser, said circulating device being connected to the lower part of said still-absorber, a connection between said still-absorber and said rectifier, and a connection between said rectifier and said circulating device.

20. Refrigerating apparatus comprising a still-absorber, a rectifier, a circulating device, a condenser, a cooling tank for said rectifier, said circulating coil, and said condenser, a trap connected between said still-absorber and said rectifier, a refrigerator connected between said rectifier and said condenser, and a connection between said trap and said circulating device.

21. A refrigerating apparatus comprising a still-absorber, a refrigerator, a trap connected between the upper part of said still-absorber and the upper part of said refrigerator, a water cooled circulating device connected to the lower part of said still-absorber and to the upper part of said trap, and a condenser connected to said refrigerator.

22. A refrigerating apparatus comprising a still-absorber, a circulating coil connected to the lower part thereof, a condenser, a cooling tank for said coil and said condenser, a refrigerator connected to the upper part of said still-absorber, to the lower part of said condenser, and to said circulating coil.

23. Refrigerating apparatus comprising a still-absorber, a circulating device connected to the lower part of said still absorber, a condenser, a cooling tank for said circulating device and said condenser, a rectifier and trap connected to the upper part of said still-absorber, a refrigerator connected between said rectifier and trap and said condenser, and a connection between said trap and said circulating device.

HENRY E. WILLSIE.